April 28, 1931. S. A. GEORGE 1,803,061
TROLLEY FROG
Filed Feb. 3, 1930 2 Sheets-Sheet 1
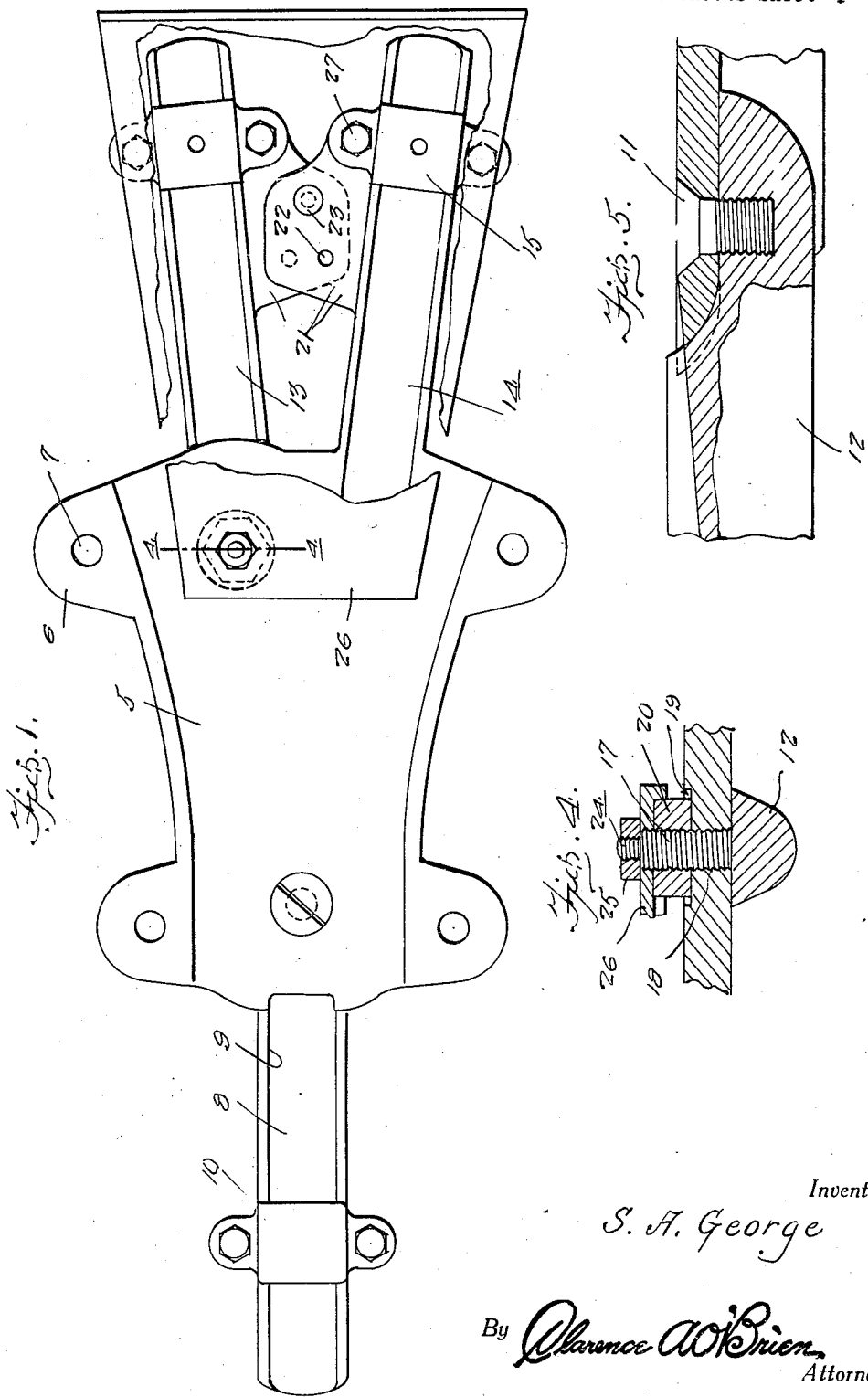
Inventor
S. A. George
By Clarence A. O'Brien
Attorney

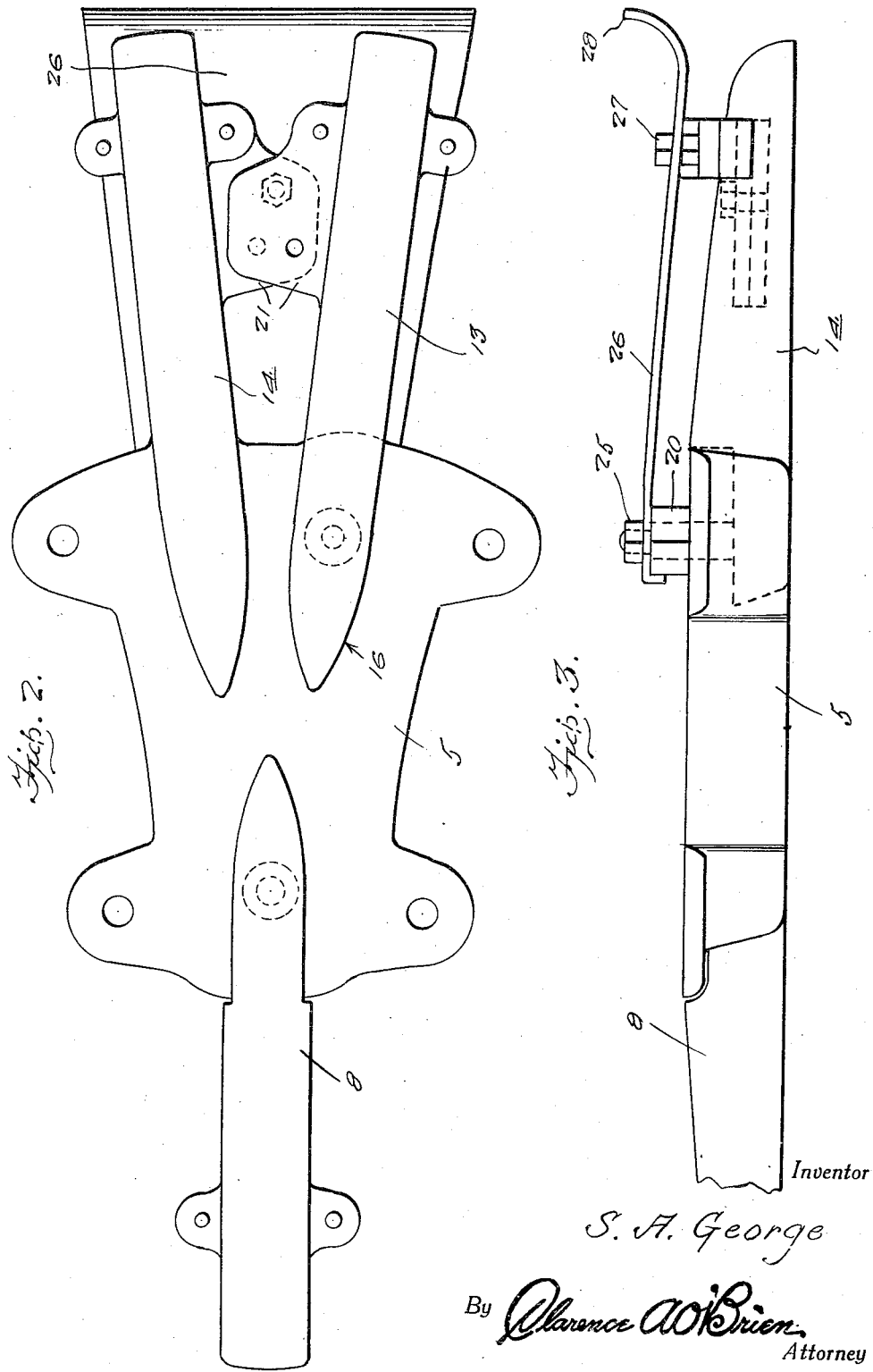

Patented Apr. 28, 1931

1,803,061

UNITED STATES PATENT OFFICE

STEPHEN A. GEORGE, OF JOHNSTOWN, PENNSYLVANIA, ASSIGNOR OF ONE-HALF TO DUNCAN MAY, OF JOHNSTOWN, PENNSYLVANIA

TROLLEY FROG

Application filed February 3, 1930. Serial No. 425,502.

The present invention relates to trolley frogs and has for its principal object to provide an adjustable arm at one end of the frog by means of which a branch trolley wire may be attached thereto at the proper angle at which the wire extends from the frog.

A further object is to provide a guard shield to prevent the trolley pole from striking the connected edges of the arms of the trolley frog should the trolley pole jump from the trolley.

A further object is to provide a trolley frog of a simple and practical construction, which is strong and durable, which may be easily and quickly mounted in position at the intersection of the trolloy line and otherwise well adapted for the purposes for which the same is intended.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a top plan view of the trolley frog with parts of the guard broken away and shown in section, Figure 2 is a bottom plan view, Figure 3 is a side elevational view, Figure 4 is a sectional view taken along a line 4—4 of Figure 1, and Figure 5 is a fragmentary sectional view through the connection of the single trolley connecting arm.

Referring now to the drawings in detail wherein for the purpose of illustration I have disclosed a preferred embodiment of the invention the numeral 5 designates the body of the trolley frog which is provided with ears 6 at each of the side edges thereof having openings 7 therein for receiving cables by means of which the frog is attached between poles at opposite sides of the trolley line in a manner well known in the art.

At one end of the body a trolley attaching arm 8 is extended, the arm having its upper surface channeled as shown at 9 for receiving the trolley line which is secured therein by a clamping member 10. The inner end of the arm is secured in overlapping relation to one edge of the body 5 by a screw 11 having its head countersunk in the upper surface of the body.

The under side of the arm 8 is formed with the usual rounded rib 12 which forms a continuation for the trolley wire for guiding the trolley over the frog.

A pair of trolley line attaching arms 13 and 14 respectively extend outwardly from the opposite end of the body, the arm 14 being cast integral with the body and being likewise provided with a channel in its upper surface for receiving the trolley line which is secured therein by the clamping member 15. The under side of each of the arms 13 and 14 are likewise formed with a rounded rib corresponding to the ribs 12 of the arm 8 and extend inwardly of the edge of the body for guiding the trolley across the frog.

The inner end of the ribs 12 are tapered as shown at 16 and are slightly spaced from each other as will be clearly observed from an inspection of Figure 2 of the drawings.

The arm 13 is pivotally attached at its inner end to the body 5 by means of a threaded stud 17 formed on the upper side of the arm and extending through a threaded opening 18 formed in the body. The upper surface of the body adjacent the opening 18 is formed with a countersink 19 for receiving a nut 20 threaded on the stud 17 for securing the inner end of the arm 13 to the body.

The adjacent side edges of the arms 13 and 14 are provided with ears 21 disposed in overlapping relation with respect to each other and having openings 22 adapted for alining whereby to receive a bolt 23 for securing the arms in adjusted position with respect to each other.

In this manner the angle of the arm 13 may be adjusted to accommodate the angle in which a branch trolley line carried by the arm 13 may extend with respect to the frog.

The upper end of the stud 17 is formed with a reduced threaded end 24 with which is associated a nut 25 for securing a guard plate 26 in position over the arms 13 and 14. The guard plate is secured to the arms by bolts 27 which are utilized for securing the clamps 15 upon the arms.

The outer edge of the guard plate 26 is curved upwardly as shown at 28 and extends outwardly beyond the ends of the arms 13 and 14 as well as outwardly beyond the overlapping ears 21 and against which the trolley pole strikes should the same jump the wire while approaching the frog. In this manner the arms 13 and 14 and the ears 21 are protected from the force of the trolley pole when striking the frog.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. A trolley frog comprising a body, a pair of trolley line attaching arms extending outwardly from one end thereof, means for pivotally attaching the inner end of one of said arms to the body of the frog and means for adjustably attaching the arms to each other.

2. A trolley frog comprising a body, a pair of trolley wire attaching arms extending outwardly from one edge of the frog, means for pivotally attaching one of the arms to the body of the frog, means for adjustably connecting the arms to each other and a guard plate secured to the body and to said arm with its outer edge protruding outwardly from the outer edge of the arm.

3. A trolley frog comprising a body, a pair of trolley wire attaching arms extending outwardly from one edge thereof, means for pivotally attaching one of the arms to the body and a pair of ears at the side edges of the arms disposed in overlapping relation and having alined openings for receiving a bolt whereby to adjustably secure the arm with respect to each other.

4. A trolley frog comprising a body, a pair of trolley wire attaching arms extending outwardly from one edge thereof, means for pivotally attaching one of the arms to the body and a pair of ears at the side edges of the arms disposed in overlapping relation and having alined openings for receiving a bolt whereby to adjustably secure the arm with respect to each other, and a guard plate secured to the body and extending outwardly over the arm whereby to protect said ears from a displaced trolley pole approaching the frog.

In testimony whereof I affix my signature.

STEPHEN A. GEORGE.